(12) United States Patent
Sano et al.

(10) Patent No.: US 6,997,960 B1
(45) Date of Patent: Feb. 14, 2006

(54) TEXTILE TREATMENTS AND FIBERS AND TEXTILE GOODS TREATED THEREWITH

(75) Inventors: Masahiro Sano, Himeji (JP); Takaharu Yasue, Himeji (JP); Fumioki Fukatsu, Himeji (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 09/171,399

(22) PCT Filed: Apr. 18, 1997

(86) PCT No.: PCT/JP97/01350

§ 371 (c)(1),
(2), (4) Date: Oct. 16, 1998

(87) PCT Pub. No.: WO97/40227

PCT Pub. Date: Oct. 30, 1997

(30) Foreign Application Priority Data

| Apr. 19, 1996 | (JP) | 8-098760 |
| Apr. 19, 1996 | (JP) | 8-098761 |
| Jul. 12, 1996 | (JP) | 8-183725 |

(51) Int. Cl.
*D06M 15/03* (2006.01)
*D06M 15/15* (2006.01)

(52) U.S. Cl. ............... 8/115.6; 8/181; 8/115.65; 106/124.1; 106/155.1; 106/162; 527/200; 527/202; 527/300; 527/310; 527/312; 527/313

(58) Field of Classification Search ............ 8/115.6, 8/181, 128.1, 115.65, 115.66, 541, 542; 106/155.1, 106/124.1, 162.2, 162; 527/200–202, 207, 527/300, 310, 312, 313
See application file for complete search history.

(56) References Cited

U.S. PATENT DOCUMENTS

| 3,651,210 | A | * | 3/1972 | Shepler et al. |
| 4,743,266 | A | * | 5/1988 | Harper, Jr. |
| 5,260,396 | A | * | 11/1993 | Kroner et al. |
| 5,385,836 | A | * | 1/1995 | Kimura et al. |
| 5,622,531 | A | * | 4/1997 | Yamada et al. |
| 5,714,560 | A | * | 2/1998 | Denzinger et al. |

FOREIGN PATENT DOCUMENTS

| JP | 62-250275 | * | 10/1987 |
| JP | 4-100976 | * | 4/1992 |
| JP | 09-100596 | * | 4/1994 |
| JP | 6-158545 | * | 6/1994 |
| JP | 07-76651 | * | 3/1995 |
| JP | 7-300770 | * | 11/1995 |
| WO | WO 95/31576 | * | 11/1995 |

OTHER PUBLICATIONS

Translation of JP 07-300770 from patent Abstracts of Japan.*

* cited by examiner

*Primary Examiner*—Margaret Einsmann
(74) *Attorney, Agent, or Firm*—Flynn, Thiel, Boutell & Tanis, P.C.

(57) ABSTRACT

A first fiber treatment comprising a functional protein prepared by treating proteins such as collagen with a crosslinking agent and a solvent-base resin; a second one comprising the above functional protein and a water-base resin; a third one comprising a water-soluble organic substance having an average molecular weight of 100 to 20000 and a reactive modifier; a fourth one comprising the above functional protein and a reactive modifier; and products such as fibers and textile goods treated with one of the treatments.

6 Claims, 4 Drawing Sheets

TEXTILE TREATMENTS AND FIBERS AND TEXTILE GOODS TREATED THEREWITH

TECHNICAL FIELD

The present invention relates to surface treatment chemicals containing protein or water-soluble organic substances, and fibers and textile goods treated with the surface treatment chemicals.

BACKGROUND ART

Hitherto, many techniques have been proposed to impart moisture absorbency to, for instance, polyester synthetic fiber or textile goods made therefrom.

For instance, there is a method (1) of treating synthetic fiber with a treating liquid containing an acrylic or polyurethane emulsion and finely powdered natural organic substances such as collagen.

However, according to the above method (1), since the natural organic substance fine powder is merely physically adhered to the synthetic fiber through an emulsion as a binder, the fine powder is likely to be removed by washing, resulting in an inferior durability. An increase of the emulsion ratio to improve the durability hardens the feel of the synthetic fiber, thus making it less applicable to practical use.

There is another method (2) of treating synthetic fibers with a treating liquid containing a modifying agent (monomer), such as polyethylene glycol compounds, for improving moisture absorbency.

The method (2) is superior in durability because the modifying agent forms a hydrophilic layer inside and on the synthetic fiber. However, only a small improvement in moisture absorbency can be observed.

Still another method (3) has been proposed to treat the synthetic fiber with a treating liquid containing a protein aqueous solution and the above modifying agent. The protein solution is obtained by dissolving, for instance, silk fiber in a calcium chloride solution and dialyzing the solution with a cellophane tube.

The method (3) gives at least an improvement in moisture absorbency due to adherence of the protein onto the synthetic fiber but the increase in the protein amount to ensure sufficient moisture absorbency gives a hard feel. On the other hand, an attempt to maintain the soft feel restricts the protein amount, which makes it impossible to obtain sufficient moisture absorbency.

In addition to the moisture absorbency and the feel described above, improvements in hydrophilic nature, antistatic property, and durability are also required for fibers and textiles.

DISCLOSURE OF THE INVENTION

First surface treatment chemicals of the present invention contain a functional protein derived by treating a protein with a cross-linking agent and a solvent-base resin.

More specifically, the functional protein is a substance obtained through the following process.

(1) Reacting an aqueous solution containing a protein with a cross-linking agent dissolved in an organic solvent, and separately obtaining the aqueous protein layer containing the cross-linking agent.

(2) Lowering the pH of the protein below its isoelectric point by adding an acid to the protein solution containing the cross-linking agent and separating the obtained precipitate to dry and pulverize it.

Any protein substance can be chosen at will for the above protein. For instance, soybean protein, whey, casein, serum-albumin, collagen, gelatin, fibroin, sericin and egg white of a hen, quail, duck, and goose and the like can be used.

For the cross-linking agent, a diisocyanate compound, dialdehyde compound, di-ketone compound and the like can be used. For the diisocyanate compound, toluene diisocyanate (TDI), diisocyanate-acid diphenylmethane (MDI), isophorone diisocyanate (IPDI), naphthalene diisocyanate (NDI) and the like can be used.

For the solvent to dissolve the cross-linking agent, chloroform, hexane, toluene and the like can be used.

For the acid, acetic acid, citric acid, succinic acid, lactic acid, tartaric acid, and fumaric acid and the like can be used.

The solvent-base resins are urethane resins, acrylic resins or vinyl chloride resins and others dissolved in solvents including at least one of dimethylformamide (DMF), methylethylketone (MEK), toluene, cyclohexane, and butyl acetate and the like.

The functional protein derived through the above described process is soluble in organic solvents and insoluble in water.

The surface treatment chemicals in the present invention can be prepared by dissolving the functional protein and mixing the solution with the solvent-base resin.

The dissolution of the functional protein can be carried out by dispersing a protein powder in an organic solvent (such as DMF) at room temperature, stirring and completely dissolving the protein powder until the liquid becomes transparent through heating to 60° C. to 80° C. and then cooling to room temperature.

The mixing with the solvent-base resin is carried out by adding the functional protein solution little by little to the solvent-base resin solution while stirring.

The content of the functional protein is from 0.1 wt. % to 50 wt. %, preferably from 1 wt. % to 30 wt. % When the content is less than 0.1 wt. %, sufficient effect cannot be obtained, while when the content is increased to more than 50 wt. %, the treating chemicals are apt to peel off and the transparency of the fiber may be lowered.

Since the surface treatment chemicals of the present invention have a mixture of the functional protein with a solvent-base resin at a molecular level, feel, hygroscopic-nonhygroscopic property, durability and transparency can be improved without degradation of the resin characteristics.

Second surface treatment chemicals of the present invention contain a functional protein derived by treating the protein with a cross-linking agent and a water-base resin.

More specifically, the functional protein of the second treatment chemical is derived from the following process.

(1) Reacting an aqueous solution containing a protein with a cross-linking agent dissolved in an organic solvent, and separately obtaining the aqueous protein layer containing the cross-linking agent.

(2) Raising the pH of the protein solution above the protein's isoelectric point and separating the modified protein to dry and pulverize it.

Any protein substance can be chosen at will for the above protein. For instance, whey, casein, serum-albumin, collagen, gelatin, fibroin, sericin and egg white of a hen, quail, duck, and goose and the like can be used.

For the cross-linking agent, diisocyanate compounds, dialdehyde compounds, diketone compounds and the like can be used. For the diisocyanate compounds, toluene diisocyanate (TDI), diisocyanic-acid diphenylmethane (MDI), isophorone diisocyanate (IPDI), and naphthalene diisocyanate (NDI) and the like can be used.

For the solvent to dissolve the cross-linking agent, chloroform, hexane, toluene and the like can be used.

The water-base resins refer to resins whose solvent is water and include emulsions and water soluble resins. Emulsions of silicon group, acryl group, urethane group, vinyl acetate group and vinyl chloride group and the like are included in the emulsion. The water soluble resins include polyvinyl alcohol, high polymer cellulose, polyethylene imine, and polyethylene oxide.

The functional protein thus obtained is water soluble but becomes insoluble after being heat set.

The surface treatment chemicals of the present invention can be prepared by dissolving the functional protein, and then mixing the solution with a water-base resin.

The functional protein is dissolved by dispersing a protein powder in water at room temperature, stirring and heating up the dispersions to 60° C. to 80° C. until the liquid becomes transparent to dissolve the protein completely, and then the solution is cooled to room temperature.

The mixing with the water-base resin is done by adding the functional protein solution to the water-base resin in an appropriate proportion.

The content of the functional protein is from 0.1 wt. % to 50 wt. %, preferably from 1 wt. % to 30 wt. %. When the content is less than 0.1 wt. %, a sufficient effect cannot be obtained, while when the content is increased to more than 50 wt. %, the fiber treating chemicals are apt to peel off or the transparency of the fiber may be lowered.

Third surface treatment chemicals of the present invention contain water soluble organic substances having an average molecular weight of 100 to 20000 and a reactive modifier.

The water-soluble organic substances include water-soluble natural organic substances and derivatives which are derived from decomposition and modification of the above-described organic substance as a base material.

The water-soluble organic substances of which the molecular weight is less than 100 are poor in durability. On the contrary, when the molecular weight of the water-soluble organic substance exceeds 20000 and at the same time the content is increased so much as to obtain sufficient functions, the fiber feel becomes hard.

The adjustment of the average molecular weight can be conducted by a chemical means such as hydrolytic degradation with a common acid or alkali.

It is believed that when the fiber is treated with the surface treatment chemicals, the soluble organic substance and the reactive modifier are polymerized by the application of heat and form a durable hydrophilic layer on the surface of and in the fiber.

The soluble organic substance can be a polysaccharide, a protein or a protein derivative.

The protein derivatives can be obtained by decomposing or modifying the protein as a base material.

Specific examples of the protein are fibroin, collagen, wool and combinations thereof.

For the protein, it is preferable to use the fibroin, considering its availability and price. However, the protein is not limited to the specific examples and other protein such as soybean protein, sericin, egg white, whey, and the like can also be used.

For the reactive modifier, for instance, (1) hydrophilic compounds having a polymerizable vinyl group in the molecule, (2) a monomer containing any one of a hydroxyl group, carboxyl group, amino group, sulfonic group, and phosphate group, (3) hydrophilic compounds having an epoxy group, and (4) compounds having an aziridine group can be used.

The specific examples of the above (1) are polyethyleneglycol diacrylate, polyethyleneglycol dimethacrylate, bisphenol-A polyethyleneglycol diacrylate, bisphenol-A polyethyleneglycol dimethacrylate, bisphenol-S polyethyleneglycol dimethacrylate and the like.

The specific examples of the above (2) are acrylic acid, methacrylic acid, maleic acid, itaconic acid, acrylamide, methacrylamide, vinyl sulfonic acid, hydroxypropyl methacrylate and the like.

The specific examples of the above (3) are polyethyleneglycol diglycidyl ether and the like.

The specific examples of the above (4) are compounds having the following chemical formula 1 and the like.

(Chemical fomula 1)

In the third surface treatment chemicals, chitosan can be used in addition to the water-soluble organic substance and the reactive modifier.

As for the chitosan, it is not necessary to limit the average molecular weight from 100 to 20000.

By adding chitosan to the third surface treatment chemicals, an improvement in moisture absorbency can be achieved.

Fourth surface treatment chemicals contain a functional protein obtained by treating a protein with a cross-linking agent and a reactive modifier.

The functional protein relating to the fourth surface treatment chemicals is the same functional protein of the second surface treatment chemicals.

The reactive modifier of the fourth surface treatment chemicals is the same reactive modifier in the third surface treatment chemicals.

The fiber in the present invention is treated with any one of the first to the fourth surface treatment chemicals.

Well known synthetic fibers such as nylon, polyester, polyurethane and the like are included in the above-described fibers.

The products of the present invention are treated with any one of the first to the fourth surface treatment chemicals.

The products include thread, textile, knitting and non-woven fabric made of the synthetic fiber described above. Cotton, wool, and hemp may be combined. The specific products are blouses, dress shirts, pants, skirts, cloth backings, and cover materials for furniture such as a chair.

The treatment method of the surface treatment chemicals is optional and can be, for instance, a dipping method or a padding method.

The dipping method includes a leaving-in-room-temperature method (Shitsuon-seiti-hou in Japanese) and a heat-and-stir method (Kanetsu-kakuhan-hou in Japanese).

The padding method includes a pad-dry method and a pad-steam method, however, the pad-steam method is preferable.

In the case of the fiber products, the protein becomes insoluble in water after the chemicals are heat-set, and the protein is not removed, even by repeated washing. The fiber products thus treated are so superior in durability that good feeling of touch, moisture absorbency, water vapor permeability, and transparency are still maintained, even after a long period of use.

Products other than the fiber products are film, sheet and leather and the like.

The leather includes vinyl leather, synthetic leather, artificial leather, split leather and resin-coated cloth.

As a method for treating a surface of film, sheet, and leather, a method of spray coating, gravure coating, or knife coating, etc. can be used.

The finished surface layer of the product formed by the surface treatment chemicals gives a good surface smoothness and a comfortable feel and the layer is so superior in transparency that print patterns on cloth, and transparency of transparent film or leather are not spoiled.

A film made from the surface treatment chemicals may be prepared in advance and a finished surface layer may be formed by affixing the film on a surface of a product.

BEST MODE FOR CARRYING OUT THE INVENTION

A First Embodiment

Surface treatment chemicals of the present embodiment correspond to a previously described first surface treatment chemicals, which are prepared as follows.

First, a functional protein is prepared as follows.

An aqueous solution containing a protein and a cross-linking agent dissolved in an organic solvent are allowed to react and an aqueous layer of the protein solution containing the cross-linking agent is separately obtained.

Then, acid is added to the protein solution containing the cross-linking agent to lower the pH below the isoelectric point of the protein. A precipitate thus derived is isolated and dried to obtain a powder of the functional protein.

The powder of the functional protein thus obtained is dispersed in an organic solvent at room temperature and the dispersions is stirred and heated up to 60° C. to 80° C., thereby completely dissolving the protein until the solution becomes transparent. Then the solution is cooled to room temperature.

The functional protein solution is mixed with a solvent-base resin by adding the solution gradually to the resin while stirring to obtain the surface treatment chemicals relating to the present embodiment.

A finished surface layer is formed by treating the surface of a leather or the like with the surface treatment chemicals.

Alternatively, a film may be prepared in advance using the treatment chemicals and a finished surface layer can be made by affixing the film on a surface of a product.

(Experiment 1)

A powder of whey protein was diluted with water to make a 3.5% protein solution, and the pH of the solution was adjusted to 12 with sodium hydroxide. A chloroform solution of 2,4-toluene diisocyanate (TDI) was added to the protein solution and allowed to react at 45° C. for two hours. After the reaction, the reacted liquid separated into a water layer and a chloroform layer after being left at rest at room temperature for two hours. The water layer was separately obtained, eliminating the chloroform layer by filtering. The pH of the water layer thus obtained was adjusted to 3.5 to precipitate a cross-linked protein. The precipitated protein was filtered and freeze-dried to obtain a powder of the functional protein.

Next, 150 g of the functional protein powder thus obtained was put into dimethylformamide (DMF) while stirring at room temperature to make a dispersion.

The dispersion was stirred for 15 minutes in a hot water bath at a temperature of 80° C. to make the powder of the functional protein completely dissolve. The liquid was then spontaneously cooled to room temperature to obtain the functional protein solution. The content of the functional protein in the solution was 15 wt. %.

For a solvent-base resin, a urethane resin solved in DMF ("CRISVON S-750 (trade name) made by Dainippon Ink and Chemicals Inc.) was used. The functional protein solution was slowly added to the solvent-base resin solution to mix with each other while stirring and a solution of the surface treatment chemicals of the present embodiment was obtained. The content of the functional protein was 10 wt. % of all solid state surface treatment chemicals.

After a pattern paper was coated with the solution of the surface treatment chemicals with a bar coater and dried at 80° C., a film of 20 μm in thickness was made.

(Comparison 1)

A resin solution without the functional protein was prepared by adding only DMF to a solvent-base resin so that the solid state resin content was 20%. Using the resin solution, a film of 20 μm in thickness was prepared in the same way as in the experiment 1.

(Comparison 2)

An insoluble collagen powder (average particle size was 5 μm) which was obtained by mechanically pulverizing shaved chipping of cowhide, was used instead of the functional protein in experiment 1 and a solution having 10 wt. % of the collagen powder in dry solid matter was obtained.

Using the solution, a film of 20 μm in thickness was prepared in the same way as in the experiment 1.

(Experiment 2)

"Luck skin U-65" (trade name, manufactured by SEIKOH CHEMICALS Co., Ltd.) was used for the urethane resin in experiment 1, and with the other conditions being the same as in the experiment 1, a solution of the surface treatment chemicals of the present embodiment was obtained.

Then, using the solution of the surface treatment chemicals for a surface treatment agent, a finished surface layer was made by coating on a vinylchloride leather sheet used for a pocketbook cover with a gravure coater. The coating amount of the solution was 20 g/m².

(Comparison 3)

In the condition of experiment 2, a solution without the functional protein was prepared.

Then, using the solution thus obtained, a finished surface layer was made by coating on vinylchloride leather in the same way as in experiment 2.

(Comparison 4)

An insoluble collagen powder (average particle size was 5 μm) which was obtained by mechanically pulverizing shaved chippings of cowhide, was used instead of the functional protein in experiment 2 and a solution having 10 wt. % of the collagen powder in dry solid matter was obtained.

Then, using the solution thus obtained, a finished surface layer was made by coating on vinylchloride leather in the same way as in experiment 2.

(Experiment 3)

Using "Luck skin U-65" (trade name, manufactured by Seiko Chemical Co. Ltd.) for the urethane resin in experiment 1, and with the same condition as in experiment 1 for other conditions, a solution of the surface treatment chemicals of the present embodiment was obtained.

Then, using the solution of the surface treatment chemicals, a finished surface layer was made by coating on an enameled vinylchloride leather sheet for a bag with a gravure coater. The coating amount of the solution was 20 g/m$^2$.

(Comparison 5)

Using the same process as in experiment 3, a solution without the functional protein was prepared.

Using the solution thus obtained, a finished surface layer was made by coating on enameled vinylchloride leather in the same way as in experiment 3.

(Comparison 6)

A collagen powder was used instead of the functional protein in experiment 3 and a solution having 10 wt. % of the collagen powder in solids constituents was obtained.

Then, using the solution thus obtained, a finished surface layer was made by coating on enameled vinylchloride leather in the same way as in experiment 3.

(Comparison 7)

Enameled vinylchloride leather was taken as the present comparison for evaluation.

(Evaluation of characteristics)

At least one of the characteristics among moisture permeability, tensile strength, and degree of elongation was measured and at least one of the characteristics between surface feel and glossiness was evaluated with regard to each of the Experiments 1 to 3 and the Comparisons 1 to 7. Utility tests A and B were also carried out and the results were evaluated. Tables 1 to 3 show the results of these evaluations.

The moisture permeability is measured in conformity with JIS L 1099-A.

The tensile strength and degree of elongation measurements are based on JIS K-7311.

For evaluating the surface feel, 20 people touched the surface of the test samples and evaluated the feel based on the criteria written below and the average of the evaluation by these people is taken as a result of the evaluation.

The glossiness is measured based on a method of specular reflection at an angle of 60 degrees of JIS K-7105.

5 points . . . excellent feel.
4 points . . . good feel.
3 points . . . normal.
2 points . . . poor feel.
1 point . . . bad feel.

The utility test A was carried out by preparing a pocketbook using the leather obtained from the experiment and checking the change at the bent portion of the leather cover.

The utility test B was performed in such a way that the leather obtained is sewn on a machine and the ease of sewing is evaluated with reference to the criterion written below by 10 people randomly selected. The result of the evaluation is an average of the points by the 10 people.

5 points . . . good smoothness, very easy to machine.
4 points . . . adequate smoothness, easy to machine.
3 points . . . normal.
2 points . . . a little tackiness, hard to machine.
1 point . . . a lot of tackiness, very hard to machine.

TABLE 1

|  | Permeability | tensile strength | elongation | touch |
| --- | --- | --- | --- | --- |
| Experiment 1 | 1900 g/m$^2$/24 h | 580 kg/cm$^2$ | 420% | 4.2 |
| Comparison 1 | 1350 g/m$^2$/24 h | 600 kg/cm$^2$ | 400% | 1.6 |
| Comparison 2 | 1920 g/m$^2$/24 h | 390 kg/cm$^2$ | 300% | 4.3 |

In Table 1, it is observed that the results in tensile strength and elongation are good and the results in permeability and feel are also good, since the film in Experiment 1 contained the functional protein.

On the other hand, since the film of Comparison 1 did not contain the functional protein, though the results in tensile strength and elongation are good, the results in permeability and feel are inferior to the film by Experiment 1.

Since the film of Comparison 2 contained collagen powder instead of the functional protein, the results in tensile strength and elongation are inferior to the film of Experiment 1, though the results in permeability and feel are good.

TABLE 2

|  | touch | utility test A |
| --- | --- | --- |
| Experiment 2 | 4.4 | no defective |
| Comparison 3 | 2.6 | no defective |
| Comparison 4 | 4.2 | blanching on bent portion |

From Table 2, it is understood that the result in the evaluation of feel is good, since the vinylchloride leather of Experiment 2 contains the functional protein in the surface layer. The result in the utility test shows no abnormality, having a high durability.

On the other hand, since the vinylchloride leather of Comparison 3 does not contain the functional protein in the finished surface layer, the feel is poor, though the utility test shows no abnormality.

Since the vinylchloride leather in Comparison 4 contains an insoluble collagen powder instead of the functional protein in the finished surface layer, blanching at the bent portion appeared, showing that the surface layer obtained by comparison 4 is defective though the feel is good.

TABLE 3

|  | Feel | Utility test B | Glossiness |
| --- | --- | --- | --- |
| Experiment 3 | 4.2 | 4.8 | 87.2% |
| Comparison 5 | 2.8 | 2.0 | 88.4% |
| Comparison 6 | 4.3 | 4.2 | 62.3% |
| Comparison 7 | 2.6 | 1.5 | 89.8% |

From Table 3, it is observed that the feel and glossiness test show good results because the functional protein is contained in the finished surface layer of the enameled vinylchloride leather of Experiment 3. Good smoothness and easy handling in sewing is also shown.

On the other hand, as the enameled vinylchloride leather of Comparison 5 does not contain the functional protein in the finished surface layer, both the feel and the utility test B show unfavorable results.

As the enameled vinylchloride leather of Comparison 6 contains the collagen powder instead of the functional protein in the finished surface layer, the leather is inferior in glossiness though the results of the feel test and utility test are good.

Since the leather of Comparison 7 is enameled vinylchloride leather without a finished surface layer, it has a good glossiness but very bad results in the feel and utility test.

A Second Embodiment

The surface treatment chemicals of the second embodiment correspond to the previously described second surface treatment chemicals and can be prepared as follows.

First, a functional protein is prepared as follows.

An aqueous protein solution and a cross-linking agent dissolved in an organic solvent are allowed to react with each other and an aqueous layer of protein solution containing the cross-linking agent is separately obtained. Incidentally, it is preferable that the protein is pretreated in advance, by conducting hydrolysis or the like, to improve its water solubility.

Then, the pH of the protein solution containing the cross-linking agent is adjusted to a pH value more than the isoelectric point of the protein. After the adjustment, the modified protein is separated, and dried to obtain a powder of the functional protein.

Secondly, the obtained protein powder is dispersed in water at room temperature, and the dispersion is heated, for instance, up to 60° to 80° C. while stirring until the liquid becomes transparent so that the powder is completely dissolved, and then the solution is cooled to room temperature.

The surface treatment chemicals of the present embodiment can be obtained by mixing the functional protein solution with a water-base resin in adequate proportions.

A surface-treated layer of film, sheet, leather, knitting, textiles or non-woven fabric is formed by treating the surface thereof with the surface treatment chemicals.

(Experiment 4)

A powder of whey protein was diluted with water to make a 3.5% protein solution and the solution was adjusted by sodium hydroxide to pH 12. A chloroform solution of 2,4-toluene diisocyanate (TDI) was added to the protein solution and kept for 2 hours at 45° C. to allow them to react with each other. After the reaction, the liquid was kept for 2 hours at room temperature. Then, a water layer and a chloroform layer were separated. The water layer was filtered to be separated from the chloroform layer. The pH of the water layer was adjusted to 7 and a functional protein powder was obtained after drying.

Then, 50 g of the functional protein powder was dispersed in 950 g of water. The dispersion was kept in a hot water bath at a temperature of 80° C. for 20 minutes while stirring to completely dissolve the protein powder. Thus, 5 wt. % of the protein solution was obtained. After the solution was naturally cooled, 82 g of the solution was mixed with 100 g of acryl type emulsion (Yodosol 2D540 (trade name) Kanebo N.S.C. Co. Ltd.), and uniformly blended with a propeller stirrer to make a solution of surface treatment chemicals.

The surface treatment solution was coated on a transparent polyvinylchloride sheet at a coating amount of 10 g/m$^2$ with a gravure coater and dried at a temperature of 120° C. to obtain a sheet having a finished surface layer.

(Comparison 8)

Instead of the functional protein used in the experiment, an insoluble collagen powder (average particle size 5 $\mu$m) derived from mechanically pulverized chippings of shaved cowhide was used. The collagen powder was mixed with an acryl type emulsion (Yodosol 2D540 (trade name) Kanebo N.S.C. Co. Ltd.), so that the content ratio of the collagen powder to the total solid matter (the collagen powder and the resin solid) reached 10 wt. % to obtain a solution of the surface treatment chemicals.

Then, after the solution of the surface treatment chemicals was coated on a polyvinylchloride sheet in the same way as in Experiment 4, a sheet having a finished surface layer was obtained by drying the coated sheet.

(Comparison 9)

Instead of the functional protein used in Experiment 4, a soluble gelatin was used (an average molecular weight was 3000). The soluble gelatin was mixed with an acryl type emulsion to obtain a solution of surface treatment chemicals.

Then, after the solution of surface treatment chemicals was coated on a polyvinylchloride sheet in the same way as in Experiment 4, a sheet having a finished surface layer was obtained by drying the coated sheet.

(Comparison 10)

The acryl type emulsion (Yodosol 2D540 (trade name)) containing no protein was coated on a polyvinylchloride sheet in the same way as in Experiment 4, and a sheet having a finished surface layer was obtained by drying the coated sheet.

(Experiment 5)

The sheet having a finished surface layer, which was obtained from the same process as in Experiment 4, was laminated on enameled polyvinyl chloride leather by using an adhesive agent to obtain enameled polyvinyl chloride leather having a finished surface layer.

(Comparison 11)

Enameled vinylchloride leather for evaluation was take as the present comparison.

(Evaluation of characteristics)

The samples obtained in Experiment 4 and Comparison 8 to 10 were checked in view of surface feel, antifouling property (water resistance), and transparency. The samples obtained in Experiment 5 and Comparison 11 were measured in glossiness and evaluated in Utility. Table 4 shows the results.

For the evaluation of the surface feel, 20 people touched the surface of the test samples and evaluated the feeling based on the criteria written below and the average of the evaluation points by the twenty people was taken as the result of the evaluation.

5 points . . . excellent surface feel.
4 points . . . good surface feel.
3 points . . . normal.
2 points . . . poor surface feel.
1 point . . . worse surface feel.

The antifouling property (water resistance) was measured as follows. A drop of water, soy sauce and a kitchen detergent (the concentration was 1 g/1000 ml) was dropped on the test samples. After 24 hours, the dropped spots were wiped off with a dried cloth and the surface conditions were evaluated by observation.

The transparency was evaluated by judging with the naked eye.

The glossiness evaluation was carried out based on the method of specular reflection at an angle of 60 degrees in JIS K 7105.

The utility test was performed in such a way that the leather obtained was sewn by a machine and the easiness of sewing was evaluated with reference to the criterion below by 10 people randomly selected. The results of the evaluation is an average of the evaluation points by the 10 people.
  5 points . . . good smoothness, very easy to machine.
  4 points . . . adequate smoothness, easy to machine.
  3 points . . . normal.
  2 points . . . a little tackiness, hard to machine.
  1 point . . . lot of tackiness, very hard to machine.

TABLE 4

|  | Surface Feel | Utility Test | Antifouling | | | Transparency | Glossiness |
|---|---|---|---|---|---|---|---|
|  |  |  | Water | Soy Sauce | Detergent |  |  |
| Experiment 4 | 4.1 | — | normal | normal | normal | transparent | — |
| Comparison 8 | 4.2 | — | normal | normal | normal | foggy | — |
| Comparison 9 | 3.9 | — | ① slimy | ② tinting | ① slimy | transparent | — |
| Comparison 10 | 2.0 | — | normal | normal | normal | transparent | — |
| Experiment 5 | 4.3 | 4.6 | — | — | — | — | 85.6% |
| Comparison 11 | 1.5 | 1.5 | — | — | — | — | 89.8% |

1 Slime occurs on the surface.
2 The color of soy sauce remains after wiping off.

As the polyvinyl chloride sheet of Experiment 4 contains the functional protein in the finished surface layer, it is clear from Table 4 that surface feel, antifouling property, and transparency are all good. Therefore, the polyvinyl chloride sheet is suitable for a tablecloth, for instance.

Since the polyvinyl chloride sheet of Comparison 8 contains an insoluble collagen powder as a protein in the finished surface layer, as for transparency, a frosted glass-like fogging appears and the sheet looks unattractive, though surface feel and antifouling property are not a problem.

Since the polyvinyl chloride sheet in Comparison 9 has a soluble gelatin as a protein in the finished surface layer, though it has no problem in surface feel and transparency, but has a problem in antifouling property. It also has a problem in terms of practical use because the soluble gelatin is eluted out when contacted with water.

Since the polyvinyl chloride sheet of Comparison 10 does not contain any protein in the finished surface layer, the result in surface feel is defective, though it has no problem in antifouling property and transparency.

As the enameled polyvinyl chloride leather in Experiment 5 contains the functional protein in the finished surface layer, it is observed that the results for surface feel and glossiness are good. The utility test is also good due to the excellent ease in sewing.

On the other hand, since the enameled polyvinyl chloride leather sheet of Comparison 11 does not contain any protein in the finished surface, it is inferior in surface feel, though it is superior in glossiness and it is very hard to sew on a machine, so the result for the utility test is poor.

(Experiment 6)
4% by weight of a solution having 5 wt. % of the functional protein solution obtained in Experiment 4, 2% by weight of a urethane type emulsion (UN-11 (trade name) made by KYOEISHA CHEMICAL Co., Ltd.), 94% by weight of water were put in a drum type dyeing machine.

Dyed panty hose were put into the dyeing machine at a bath ratio of 1:20 and kept immersed for 15 minutes at 40° C. and the absorbed water was removed with a centrifugal dehydrator at a pick-up rate of 30%. Then, by heat setting the panty hose with a steam drier, panty hose on the surface of which the protein was firmly fixed were obtained.

(Comparison 12)
Panty hose on the market having the same yarn configuration as that used in Experiment 6 were taken as Comparison 12.

(Comparison 13)
The dyed panty hose which were used in Experiment 6 were used for Comparison 13.

(Comparison 14)
Similar to Experiment 6 but not using protein, 2% by weight of the urethane type emulsion (UN-11 (trade name)) and 98% by weight of water were put into the drum type dyeing machine.

Panty hose were processed under the same conditions as in Experiment 6.

(Comparison 15)
Using soluble fibroin (average molecular weight 4800) instead of the functional protein in Experiment 6, panty hose firmly fixed with fibroin on the fiber surface were obtained through the same process as in Experiment 6.

Figure 2:
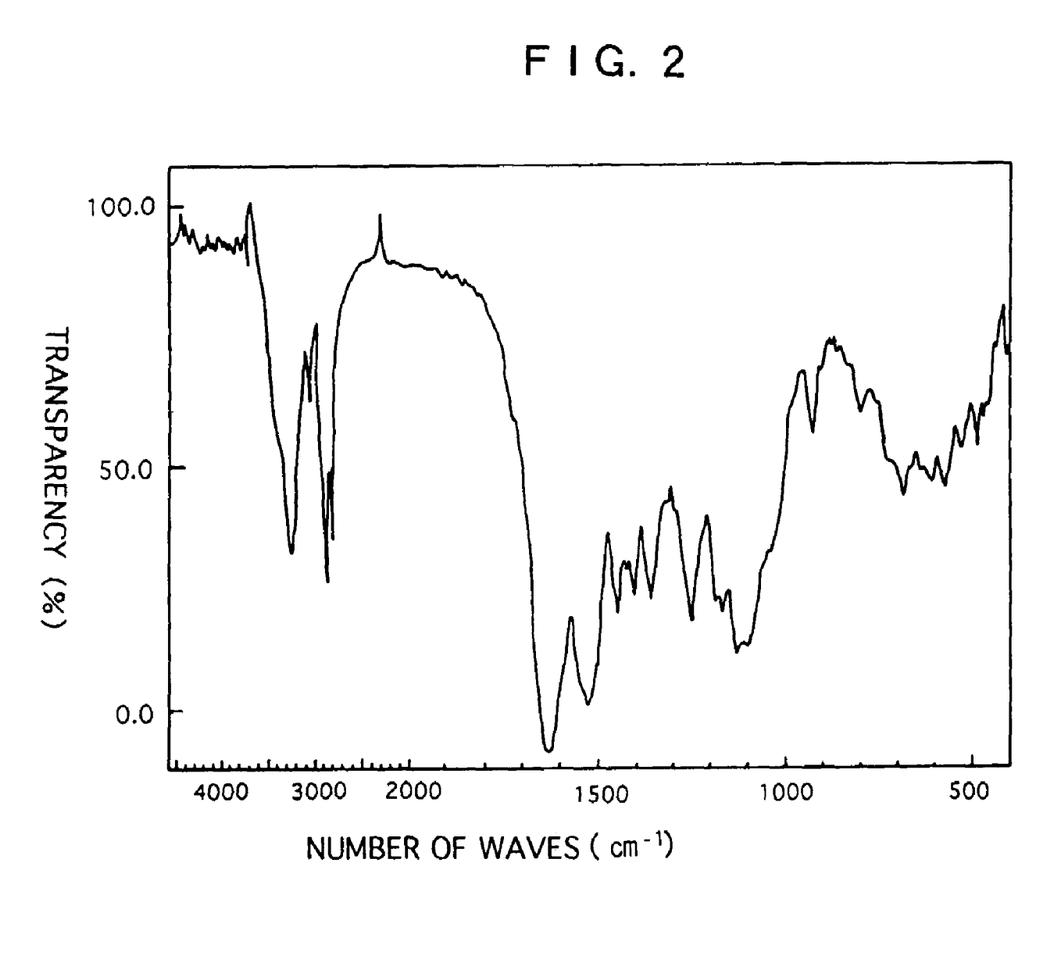
FIG. 2 is a measurement result with FTIR for a pair of the panty hose of experiment 6, after washing 10 times.
Figure 3:
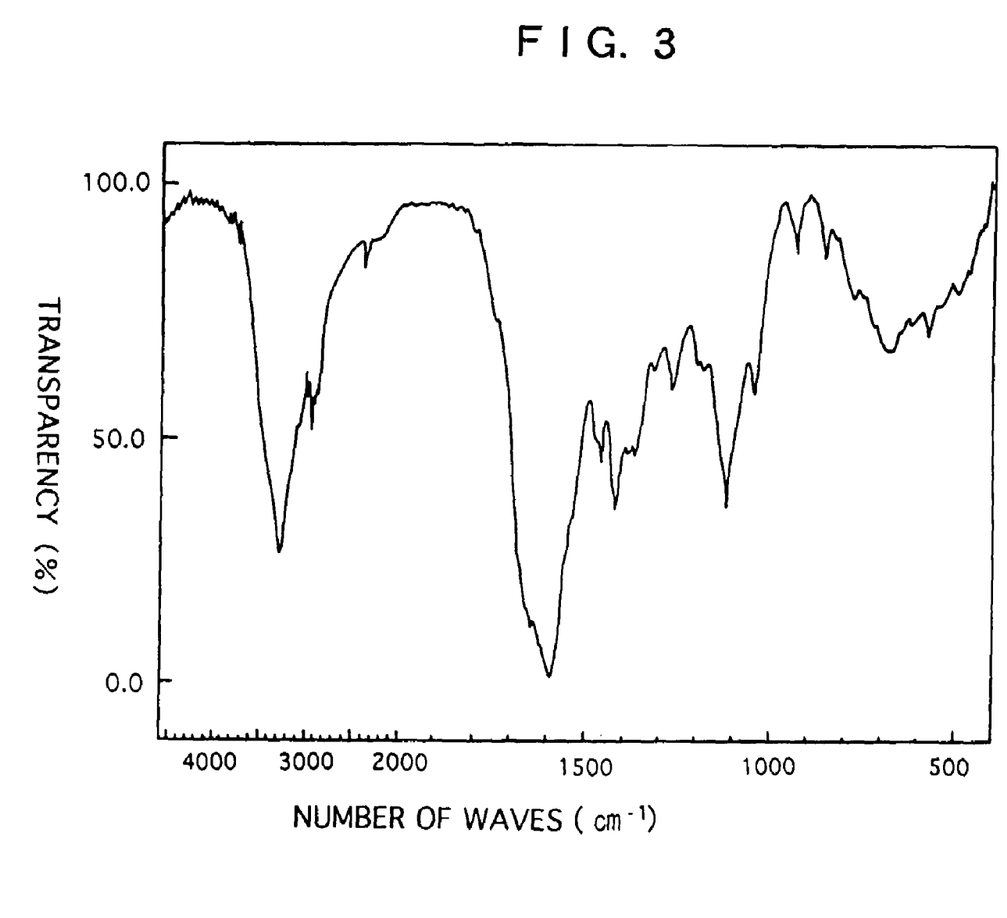
FIG. 3 is a measurement result with FTIR for a pair of the panty hose in comparison 14.
Figure 4:
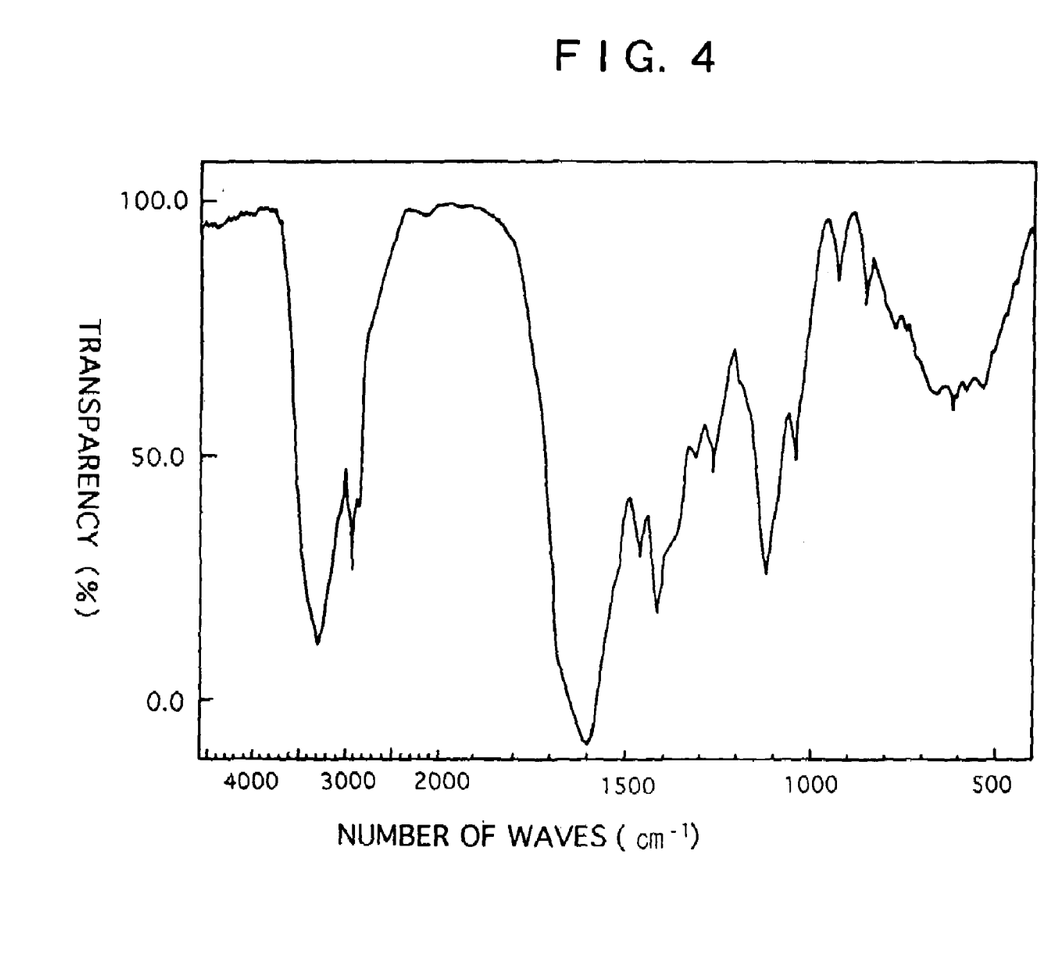
FIG. 4 is a measurement result with FTIR for a pair of the panty hose in comparison 15 after washing 5 times.

(Evaluation of Characteristics)
Water absorbency and surface feel of the panty hose in Experiment 6 and Comparisons 12 to 15 were evaluated and each frictional electrification voltage was measured. These results are shown in Table 5. The panty hose in Experiment 6 and Comparisons 14 to 15 were checked in view of the adhering condition of the protein. These results are shown in FIG. 2 to FIG. 4.

The water absorbency measurement was performed based on JIS L 1096-A.

The test method for surface feel was the same as the method in Experiment 1.

The frictional electrification voltage was measured in compliance with JIS L 1094-B.

To evaluate the fixing condition of the protein, the panty hose were violently stirred in 1 liter of water at 40° C. for 24 hours and the adherents were forcibly extracted and dried. The solid residue is measured with FTIR (Fourier Transform Infrared Spectrometer).

For the evaluation of Experiment 6, the panty hose obtained in Experiment 6 were washed 10 times and the panty hose in Comparison 15 were washed 5 times, then, the protein adhesion was measured. Incidentally, one washing is counted by washing the panty hose by using a monolayer fully-automatic home washer with a home laundry detergent (Monogen uni (trade name) P & G Co. Ltd.) at a concentration of 2 g/liter for 5 minutes, rinsing 2 times, and dewatering for 4 minutes. The panty hose are put in a wash-net during the washing.

Figure 1:
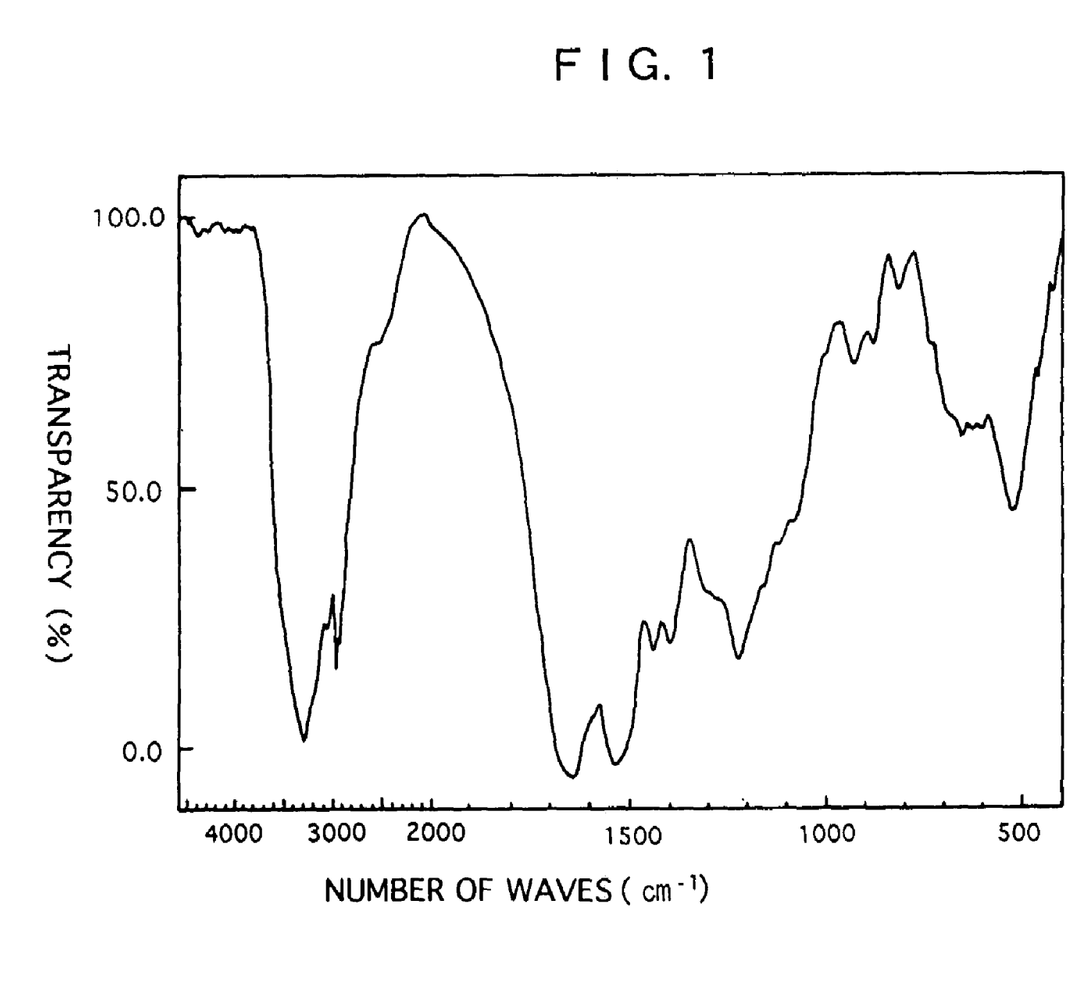
FIG. 1 is a measurement result with FTIR for the functional protein obtained in experiment 4.

The FTIR measurement result of the dried sample of the functional protein 5 wt. % solution obtained in Experiment 4 is shown in FIG. 1. According to FIG. 1, peaks of protein caused by an amide bond are found at around 1550 cm$^{-1}$ and 1650 cm$^{-1}$.

TABLE 5

| | Surface Feel | Water-absorbing Speed | Frictional Electrification Voltage (V) |
|---|---|---|---|
| Experiment 6 | 4.2 | less than 1 sec. | 1200 |
| Comparison 12 | 3.6 | more than 5 min. | 3800 |
| Comparison 13 | 3.0 | more than 5 min. | 2400 |
| Comparison 14 | 3.2 | more than 5 min. | 4300 |
| Comparison 15 | 3.4 | 10 sec. | 1600 |

From Table 5, it is understood that the panty hose have a good surface feel and also good water absorbency, since the panty hose of Experiment 6 have the functional protein fixed on the fiber surface. The panty hose quickly absorb sweat, rapidly canceling musty feelings. They also have a good antistatic property. These effects are also obtained when the finished surface layer containing the functional protein is formed on a polyester cloth and the like.

From the result of FTIR measurement shown in FIG. 2, peaks caused by the protein can be seen at around 1550 cm$^{-1}$ and 1650 cm$^{-1}$, which shows that the functional protein remains on the fiber surface without being washed out, even after 10 times of washing.

Since the panty hose in Comparison 12 and 13 are commercially available and have no protein on the fiber surface, they are so poor in water absorbency that they cannot quickly absorb sweat and have a musty feeling. They are also inferior in antistatic property, though they are normal in surface feel.

Since the panty hose of Comparison 14 have no protein on the fiber surface, they are found to be inferior in water absorbency and antistatic property.

Since the panty hose of Comparison 15 have soluble fibroin as a protein, it is found in Table 5 that they are superior in surface feel, water absorbency and antistatic property. However, as shown in FIG. 4, there is no peak characteristic of a protein, which shows that the soluble fibroin was removed from the fiber surface after 5 washes.

A Third Embodiment

Surface treatment chemicals of the third embodiment correspond to the third surface treatment chemicals, having the following constituents and solvents.

| Soluble organic substance | 1 to 15 wt. % |
|---|---|
| reactive modifier | 0.1 to 10 wt. % |
| others | 0 to 10 wt. % |

As the solvent, water, alcohol, dimethyl formamide, acetone, dimethyl sulfoxide or a mixture thereof can be used.

A polymerization initiator, a carrier for the reactive modifier and others may be added as necessary as other constituents.

The polymerization initiator includes peroxides, azo compounds, and metal salts.

The carrier is to help the reactive modifier penetrate deep inside the fibers from the surface layer. Specific examples of the carrier are chlorobenzenes, methyl naphthalenes, diphenyls, aromatic esters, and aliphatic halogenated hydrocarbons and so on.

(Experiment 7)

In the third embodiment, a specific example of constituents of the surface treatment chemicals and each concentration were as follows.

| a hydrolytic degradation product of silk fibroin | 5 wt. % |
|---|---|
| a compound having a chemical formula 2 | 5 wt. % |
| water | 89 wt. % |
| $Zn(BF_4)_2$ | 1 wt. % |

(Chemical formula 2)

The silk fibroin hydrolytic degradation product of Experiment 7 was obtained as follows.

Silk fibroin yarn from which sericin was removed by an ordinary method was dissolved in 2N-HCl solution at 70° C. for 1 hour. Then, the solution was neutralized with caustic soda to obtain the hydrolytic degradation product solution of fibroin. A fibroin powder was obtained by spray drying the fibroin solution. The fibroin powder had a molecular weight of about 4800 and shows water solubility.

Taffeta cloth made from 100% polyester (Meduke [Japanese unit showing weight of a textile for predetermined area] 120 g/m$^3$) was impregnated in the surface treatment chemicals and was wrung to an impregnation rate of 70% with a mangle. The cloth was treated with heated moisture at 105° C. for 10 minutes and put into a water bath at 40° C. for 10 minutes. Then the cloth was dried and treated to heat set.

(Experiment 8)

In the third embodiment, a specific example of each constituent of the surface treatment chemicals and their concentration were as follows.

| Hydrolytic degradation product of silk fibroin | 2 wt. % |
|---|---|
| collagen | 3 wt. % |
| a compound having the chemical formula 1 | 2 wt. % |
| a compound having the chemical formula 3 | 4 wt. % |
| water | 88.5 wt. % |
| $(NH_4)_2S_2O_8$ | 0.5 wt. % |

(Chemical fomula 3)

As the collagen, NUTRILAN (trade name, manufactured by HENKEL HAKUSUI) which was a powder having an average molecular weight of about 1500 was used.

The treatment on taffeta cloth with the surface treatment chemicals was carried out in the same way as in Experiment 1.

(Experiment 9)

In the above embodiment, a specific example of each constituent of the surface treatment chemicals and their concentration were as follows.

| | |
|---|---|
| Hydrolytic degradation product of silk fibroin | 4 wt. % |
| a compound having the chemical formula 3 | 2 wt. % |
| a compound having the chemical formula 4 | 4 wt. % |
| water | 39.5 wt. % |
| $(NH_4)_2S_2O_8$ | 0.5 wt. % |
| chitosan 1% aqueous solution | 50 wt. % |

(Chemical formula 4)

As the chitosan, CTA-1 lactic acid (trade name, Kataoka Chikarin Co., Ltd.) having an average molecular weight of about 300,000 was used.

The treatment on taffeta cloth with the surface treatment chemicals was carried out in the same way as in Experiment 7.

(Comparison 16)

The amount of the hydrolytic degradation product of silk fibroin in the surface treatment chemicals of Experiment 7 was set to 0 and the amount of water was changed to 94 wt. %. Other constituents and their concentrations were the same as in Experiment 7.

The treatment on the taffeta cloth with the surface treatment chemicals was carried out in the same way as in Experiment 7.

(Comparison 17)

The amount of the hydrolytic degradation product of silk fibroin and collagen in the surface treatment chemicals of Experiment 8 were set to 0 and the amount of water was changed to 93.5 wt. %. Other constituents and their concentrations were the same as in Experiment 7.

The treatment on the taffeta cloth with the surface treatment chemicals was carried out in the same way as in Experiment 7.

(Comparison 18)

The amount of the hydrolytic degradation product of silk fibroin and chitosan in the surface treatment chemicals of Experiment 9 were set to 0 and the amount of water was changed to 93.5 wt. %. Other constituents and their concentrations were the same as in Experiment 8.

The treatment on the taffeta cloth with the surface treatment chemicals was carried out in the same way as in Experiment 7.

(Comparison 19)

Silk fibroin having a high molecular weight was used instead of the hydrolytic degradation product of silk fibroin in the surface treatment chemicals of Experiment 7. Other constituents and their concentrations were the same as in Experiment 7. Silk fibroin having a high molecular weight in this comparison was obtained from the following process.

Silk fibroin yarn from which sericin was removed by a common method was heated to be dissolved in a 50 wt. % aqueous solution of calcium chloride and the solution thus obtained was dialyzed and desalted through a cellulose tube. The concentration of fibroin in the fibroin solution thus obtained was 4.2 wt. %. The molecular weight of fibroin in the solution was about 100,000. Incidentally, since the solution is unstable (tends to gel in a few days), it was used within the day of preparation.

The treatment on the taffeta cloth with the surface treatment chemicals was carried out in the same way as in Experiment 7.

(Comparison 20)

Untreated polyester cloth without any treatment with surface treatment chemicals was used as Comparison 20.

(Evaluation of Characteristics)

Moisture absorbency at the start and after washing and frictional electrification voltage of the treated taffeta cloth obtained by the process in Experiments 7 to 9 and Comparisons 16 to 20 were measured. The feel of the cloth was also evaluated. These results are shown in Tables 6 and 7.

The moisture absorbency was measured by: leaving samples of treated taffeta cloth for 12 hours in an atmosphere of 23° C., 30% RH to obtain a moisture condition, transferring to a place having an atmosphere of 30° C., 80% RH, and measuring the change in weight.

The washing was carried out based on JIS L-0217 method 103.

The measurement of the frictional electrification voltage was performed in compliance with JIS L-1094 method B.

The feeling of the cloth was evaluated by randomly gathered 20 people to touch the samples and evaluate based on the criterion written below, on the assumption that the samples were used for a dress shirt.

Point 5 . . . soft and very good feeling Point 4 . . . soft and good feeling Point 3 . . . normal. Point 2 . . . stiff and feeling is bad. Point 1 . . . stiff and feeling is very bad.

The mark in the feeling column of the table shows; ⊙—average 4 to 5 points, ○—average 3 to less than 4 points, ∆—average 2 to less than 3 points, x—average 1 to less than 2 points.

TABLE 6

| | Moisture Absorbency (mg/m²) | | Feeling | Frictional Elect. Voltage (V) |
|---|---|---|---|---|
| | Beginning | After Washing | | |
| Experiment 7 | 1800 | 1650 | ⊙ | 220 |
| Experiment 8 | 2050 | 1800 | ⊙ | 180 |
| Experiment 9 | 2400 | 1900 | ⊙ | 250 |

TABLE 7

| | Moisture Absorbency (mg/m²) | | Feeling | Frictional Elect. Voltage (V) |
|---|---|---|---|---|
| | Beginning | After Washing | | |
| Comparison 16 | 600 | 500 | ○ | 1200 |
| Comparison 17 | 700 | 550 | ○ | 1050 |
| Comparison 18 | 550 | 450 | ○ | 950 |
| Comparison 19 | 1400 | 1100 | x | 360 |
| Comparison 20 | 150 | — | ○ | 6800 |

From Table 6, it is understood that the amount of moisture absorbed in the treated taffeta cloth in Experiments 7 to 9 is high both at the beginning and after washing, showing that the taffeta has good moisture absorbency, because the taffeta is treated with a surface treatment chemicals containing a water-soluble organic substance having an average molecular weight from 100 to 20000 and a reactive modifier. And the stuffy feeling of the treated taffeta cloth can be reduced when used for apparel. Especially, the taffeta of Experiment 9 contains chitosan and shows a remarkable improvement in moisture absorbency.

The feeling of the treated taffeta cloth of Experiment 9 is soft and very good.

Moreover, the treated taffeta cloth of Experiment 9 has a low frictional electrification voltage, showing that thus treated taffeta is a material that gives little discomfort caused by static electricity.

The treated taffeta of Experiment 8 where taffeta is treated by surface treatment chemicals containing silk fibroin and collagen as a water-soluble organic substance, and compounds expressed by the chemical formulas 1 and 3 for reacting modifying agent, has more improved moisture absorbency and frictional electricity characteristics than the treated taffeta has in Experiment 7.

From Table 7, it is understood that the amount of moisture absorbed in the treated taffeta cloth in Comparison 16 is low both at the beginning and after washing, showing that the taffeta is faulty in moisture absorbency, because the taffeta is treated with the surface treatment chemicals used in Experiment 1, which contains no water-soluble organic substance. The taffeta has a high frictional electrification voltage, which shows thus treated taffeta is a material that is apt to give discomfort resulting from static electricity.

The treated taffeta cloth in Comparison 17 is treated with the surface treatment chemicals used in Experiment 8 which has no water-soluble organic substance, and has a low moisture pickup and a high frictional electrification voltage.

The treated taffeta cloth in Comparison 18 is treated with the surface treatment chemicals used in Experiment 9 which has no water-soluble organic substance, and has a low moisture pickup and a high frictional electrification voltage.

The treated taffeta cloth in Comparison 19 is treated with the surface treatment chemicals used in Experiment 7 which contains a high molecular weight silk fibroin instead of a hydrolytic degradation product of silk fibroin, and is inferior in feeling.

The polyester cloth in Comparison 20 is not treated and has a very small moisture pickup and a very high frictional electrification voltage.

A Fourth Embodiment

The surface treatment chemicals of the present embodiment correspond to the previously described fourth surface treatment chemicals and has the functional protein used in the second surface treatment chemicals and the reactive modifier used in the third surface treatment chemicals.

(Experiment 10)

A powder of whey protein and a hydrolytic degraded silk fibroin (weight distribution ratio 8:2) was diluted with water to make a 3.5% protein solution, and the pH of the solution was adjusted to 12 with sodium hydroxide. A chloroform solution of 2,4-toluene diisocyanate (TDI) was added to the protein solution and allowed to react at 45° C. for two hours. After the reaction, the reacted liquid was kept for two hours at room temperature and separated into a water layer and a chloroform layer. Then the reacted liquid was filtered to be separated into the water layer and the chloroform layer. The pH of the water layer thus obtained was adjusted to 7, and the water layer was dried to obtain a functional protein powder.

A specific example of constituents and the concentration of the surface treatment chemicals were as follows.

| | |
|---|---|
| above described functional protein powder | 5 wt. % |
| a compound having the chemical formula 5 | 4 wt. % |
| a compound having the chemical formula 6 | 3 wt. % |
| water | 88 wt. % |

(Chemical formula 5)

(Chemical formula 6)

Using the surface treatment chemicals of the present experiment, polyester fibers (100 d/ two folded yarn 48 filaments) was treated according to the following steps from ① to ⑥ written below and socks were made of thus treated yarn.

① The treated fiber was dyed in a cheese winding state and dried.

② The dyed cheese wound fiber was put into an Oba Myer dyeing machine and the surface treatment chemicals were applied at a bath ratio 1:20 to the fiber at 20° C. for 20 minutes.

③ The treated fiber was dehydrated with a centrifugal dehydrator at a pick up rate 100%.

④ The dehydrated fiber was put into a pressure vessel filled with moisture vapor and heated at 100° C. for 20 minutes.
⑤ The heat treated fiber was washed and dried.
⑥ With a circular knitting hosiery machine, socks were made of the treated fiber.

(Comparison 21)

The fiber obtained from Experiment 10 was dyed without any further treatment and socks were made in the same manner as in Experiment 10.

(Evaluation of Characteristics)

Moisture pickup, moisture absorbing speed, and frictional electrification voltage after washing were measured on the socks obtained in Experiment 10 and Comparison 21. The results are shown in Table 8.

The washing was carried out 50 times in conformity with JIS L-0217 Method 103.

The moisture absorbency was measured by; conditioning the moisture of a sample by leaving it in an atmosphere at 23° C., 30% RH for 12 hours, transferring it into a room at 30° C., 80% RH and measuring the change in weight between before and after moisture conditioning.

The moisture-absorbing speed was determined by measuring the time for a drop weighing about 40 mg to be absorbed completely after being dropped from 3 cm high on a pair of socks.

The frictional electrification voltage was measured based on JIS L-1094.

TABLE 8

| | Moisture Pickup (%) | | Moisture-absorbing Speed (second) | | Frictional Electrification Voltage (V) | |
|---|---|---|---|---|---|---|
| | Beginning | After Washing | Beginning | After Washing | Beginning | After Washing |
| Experiment 10 | 2.2 | 2.0 | <1 | <1 | 200 | 680 |
| Comparison 21 | 0.2 | 0.1 | 600< | 600< | 3400 | 5800 |

From Table 8, it is found that the moisture pick-up, moisture absorbing speed, and frictional electrification voltage are all good, since the socks of Experiment 10 is made of the fiber treated with the fourth surface treatment chemicals.

On the other hand, since the socks of Comparison 21 are made of fibers not treated with the fourth surface treatment chemicals, all the moisture pickup, moisture absorbing speed, and frictional electrification voltage are poor.

INDUSTRIAL AVAILABILITY

The present invention relates to surface treatment chemicals for improvement in hygroscopic-nonhygroscopic characteristics and is applicable as surface treatment chemicals for yarn, knitting, textiles and non-woven fabric.

What is claimed is:

1. Surface treatment chemicals for forming a polymerization reaction product on the surface of a fiber in which the improvement is characterized in that said surface treatment chemicals comprise a water-soluble organic substance selected from the group consisting of at least one of a protein selected from fibroin, collagen and wool, derivatives thereof and polysaccharides, having an average molecular weight of 100 to 20,000, a polymerization initiator and a reactive modifier which is at least one member selected from the group consisting of polyethylene glycol diacrylate, polyethylene glycol dimethacrylate, bisphenol A polyethylene glycol diacrylate, bisphenol A polyethylene glycol dimethacrylate, bisphenol S polyethylene glycol dimethacrylate and polyethylene glycol diglycidyl ether.

2. The surface treatment chemicals according to claim 1, wherein the water-soluble organic substance is fibroin.

3. The surface treatment chemicals according to claim 1, wherein the water-soluble organic substance is collagen.

4. The surface treatment chemicals according to claim 1, wherein the water-soluble organic substance is wool.

5. The surface treatment chemicals according to claim 1, wherein the water-soluble organic substance is a polysaccharide.

6. Surface treatment chemicals for forming a polymerization reaction product on the surface of a fiber in which the improvement is characterized in that said surface treatment chemicals comprise chitosan in addition to a reaction product of a water-soluble organic substance selected from the group consisting of at least one of protein, protein derivatives and polysaccharides, having an average molecular weight of 100 to 20,000, a polymerization initiator and a reactive modifier.

* * * * *